United States Patent
Svensson

(10) Patent No.: US 6,411,529 B1
(45) Date of Patent: Jun. 25, 2002

(54) CONTROL FOR POWER PLANT

(75) Inventor: Kjell Svensson, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/743,853

(22) PCT Filed: May 15, 2000

(86) PCT No.: PCT/SE00/00956

§ 371 (c)(1),
(2), (4) Date: Jan. 17, 2001

(87) PCT Pub. No.: WO00/70737

PCT Pub. Date: Nov. 23, 2000

(30) Foreign Application Priority Data

May 19, 1999 (SE) .................................. 9901810

(51) Int. Cl.[7] .............................................. H02M 5/40
(52) U.S. Cl. ........................... 363/35; 363/129; 363/51; 361/101
(58) Field of Search ........................... 363/35, 129, 125, 363/127, 128, 51, 54, 53; 361/101; 323/908

(56) References Cited

U.S. PATENT DOCUMENTS 5,644,485 A * 7/1997 Asplund ...................... 363/129
5,872,707 A * 2/1999 Asplund ...................... 363/51
5,999,388 A * 12/1999 Asplund ...................... 323/908

* cited by examiner

Primary Examiner—Shawn Riley
(74) Attorney, Agent, or Firm—Dykema Gossett PLLC

(57) ABSTRACT

A plant for transmitting electric power which employs a first combination of a turn off semiconductor and controllable semiconductor connected in antiparallel and a second combination of a turn off semiconductor and antiparallel wherein the first combination is alternately conducting and blocking current for producing an alternating current output and the second combination is conducting during normal operation of the plant. When a fault occurs, a disconnect switch opens and separates the plant from other plants located on the network.

15 Claims, 2 Drawing Sheets

CONTROL FOR POWER PLANT

FIELD OF THE INVENTION AND PRIOR ART

The present invention relates to a plant for transmitting electric power comprising a semiconductor device of turn-off type connected in series with a conductor and a member connected in anti-parallel therewith able to assume a state in which it blocks a conduction of current therethrough when a voltage is applied over the power semiconductor device in the conducting direction thereof and a state in which it conducts a current therethrough when a voltage is applied over the power semiconductor device in the opposite direction.

"A plant for transmitting electric power" is to be given a very broad sense and is intended to comprise in principle all equipment and the like in which electric power is fed in a conductor.

However, the invention is particularly well applicable to the case of transmitting high electric powers through high voltage, in which high voltage is typically a voltage between 2 and 400 kV, and then primarily in connection with stations provided with converters for converting the voltage with respect to level and/or type (direct voltage, alternating voltage), and for that reason the particular case of a plant having a VSC-converter for converting direct voltage into alternating voltage or direct voltage and conversely will hereinafter be described for illuminating, but accordingly not in any way restricting, the invention and the problem forming the basis therefor.

A plant of the type defined in the introduction is schematically illustrated in appended FIGS. 1 and 2, said plant having a VSC (Voltage Source Converter)-converter, which here is constituted by a so called 6-pulse bridge having three phase legs 1–3, each consisting of two current valves 4–9 connected in series, which in their turn are formed by a first power semiconductor device 10 of turn-off type and a rectifying member 11 in the form of a so called free-wheeling diode connected in anti-parallel therewith. Each valve comprises in practise a comparatively high number of power semiconductor devices of turn-off type connected in series and free-wheeling diodes for enabling the valve to take the high voltages it has to take in the blocking state. The midpoints between the two valves of the respective phase leg are at a phase output 12 connected through a phase reactor 13 to a phase each of a three phase alternating voltage network 14. The phase legs are at the ends thereof connected to a pole conductor 15, 16 each of a direct voltage network 17, the voltage of which is defined through two capacitors 18, 19 connected in series and having a grounded midpoint 20.

The power semiconductor devices 10 of turn-off type are controlled in a way known per se through a control arrangement 21 according to a determined pulse width modulation pattern (PWM) for using the direct voltage over the DC-capacitors 18, 19 to generate a voltage on the phase output 12, the fundamental tone component of which constitutes an alternating voltage having a desired amplitude, frequency and phase position. The switching frequency of the power semiconductor devices 10 is then usually 1–3 kHz, but the frequency of the alternating voltage will be 50 or 60 Hz. The plant has also a breaker 33 adapted to close and open, respectively, the connection between the alternating voltage network and the converter, and which is closed when a voltage is supplied to the converter after interruption of the operation.

The principle of a VSC-converter already known and just described implies that the direct voltage is higher than the peak value of the alternating voltage, i.e. the diodes 11 connected in anti-parallel are reversed biased when the converter is blocked. When a ground fault occurs on the direct voltage side, which is schematically indicated at 22, this means that the diodes 11 will be excerted to a short circuit current having a peak value being approximately 2,5 times higher than a symmetrical short circuit current until the breaker 33 therebehind has opened, which takes place after 2–3 periods. The blocking of the 6-pulse bridge does not prevent the fault current as schematically indicated at 23. This means in the practise that the users require that the diodes have to be able to take said current therethrough during a considerably longer time, maybe 12–20 periods, for having a sufficient safety margin, which means that unreasonable demands are put on the diodes, which have to be heavily over-dimensioned for satisfying this and they will by that be very costly.

Another problem adhered to a converter of this type concerns the putting of the converter under voltage after an interruption of the operation. When the alternating voltage breaker in such a case is closed the DC-capacitors 18, 19 are charged through the diodes 11 in the valves. Energy stored in the phase reactor 13 when the capacitors are charged will raise the direct voltage further, in the worst case to a duplicating of the direct voltage. This problem may be solved by using a so called switching-in-resistance, but that solution is costly and it is desired to improve the result thereof.

It is shown in FIG. 2 how a so called quick disconnector 24 is arranged between the direct voltage network 17 and the converter for the respective pole conductor. The direct voltage network has in this case a so called meshed fashion with a system of a plurality of stations with converters connected in parallel to the direct voltage network. The quick disconnector 24 is formed by a power semiconductor device 25 of turn-off type and a diode 26 connected in anti-parallel therewith and has the object to isolate the converter at a ground fault on the direct voltage network 17, so that the converter will not feed a large current directly into such a ground fault. However, the presence of the diode 26 means that the quick disconnector 24 will be conducting in one direction. This results in its turn in the fact that if a ground fault 27 schematically indicated occurs within the converter, all the converters connected to the system will feed current into the fault, such as indicated through the dashed lines 28–30. If all the stations of the system, as is the case in FIG. 2, are provided with quick disconnectors of their own they will open as a consequence of the overcurrent and this means that all transmission on the direct voltage network will be interrupted as a consequence of an internal fault in one of the stations, which of course is unacceptable.

SUMMARY OF THE INVENTION

The object of the present invention is to provide a plant for transmitting electric power of the type defined in the introduction, which has a function improved in certain respects with respect to such plants already known and enables a reduction of the inconveniences discussed above.

This object is according to the invention obtained by providing such a plant, in which said member is formed by a controllable second power semiconductor device having the conducting direction opposite to that of said first power semiconductor device of turn-off type.

Through this totally new approach to use a controllable power semiconductor device as a member connected in anti-parallel with a power semiconductor device of turn-off type a number of advantages in different operation situations are obtained. By arranging the controllable second power semiconductor device the flexibility is considerably increased, since it will be possible to design the unit formed by the two power semiconductor devices to either block when a voltage is applied over the power semiconductor device of turn-off type in the blocking direction or conduct by controlling the second power semiconductor device to conduct. Thus, an optimum adaption to the operation situations prevailing may be obtained.

According to a preferred embodiment of the invention, which is applicable to a plant comprising a VSC-converter for converting direct voltage into alternating voltage or direct voltage and conversely and which has at least one phase leg with two current valves connected in series, and in which a point of the phase leg between said valves is intended to be connected to a phase of a direct or alternating voltage network and the opposite ends of the phase leg are intended to be connected to a pole conductor each of a direct voltage network, the valves are formed by at least one said first power semiconductor device and a second power semiconductor device connected in anti-parallel therewith. This means that in the case discussed above of a ground fault on the direct voltage side the short circuit current may through the converter to the ground fault be eliminated very rapidly by controlling the second power semiconductor device in a corresponding way. This means that in the case that this power semiconductor device is a controllable power semiconductor device being not of turn-off type, such as a thyristor, the current could be eliminated after a maximum of one period, which may be compared with the considerably longer time it will take before the so called back-up-breaker located therebehind between the converter and the alternating voltage network may break or interrupt. Would this second power semiconductor device be of turn-off type the fault current could be eliminated even more rapid.

According to another preferred embodiment of the invention the second power semiconductor device of the valve is controllable but not of turn-off type. An advantage of using such a power semiconductor device, which preferably is a thyristor, in the valve instead of a power semiconductor device of turn-off type is that it is not required that the energy stored in inductances, the alternating voltage reactor or transformers has to be dealt with by for example capacitors between the phases.

According to another preferred embodiment of the invention the plant comprises a switch having the first and the second power semiconductor device, and the first power semiconductor device of turn-off type is adapted to conduct current during normal function of the plant and to be controlled to be turned off for fulfilling a disconnector function when this is desired. By arranging a first power semiconductor device of turn-off type and a controllable second power semiconductor device connected in antiparallel therewith in this way for fulfilling said disconnector function the problems discussed above at ground faults within a converter can be solved in a satisfying way. Thus, by controlling the second power semiconductor device to the blocking state simultaneously as the first power semiconductor device is turned off in the disconnector arranged at the converter in question it may be prevented that current is fed into the fault in question from the direct voltage network and from possibly other converters. This means in its turn that no over-current will occur in the other converters in the case of a multiple station system, so that the transmission on the rest of the network will continue as if the fault has never occurred. This also constitutes other preferred embodiments of the invention.

According to another preferred embodiment of the invention the second power semiconductor device is of turn-off type, which is particularly advantageous in the case when the two power semiconductor devices belong to a switch having a disconnector function, since the disconnecting may then take place very rapidly and the two components of turn-off type may then be controlled by the same order, which simplifies the control electronic.

According to another preferred embodiment of the invention, which relates to a plant according to above having a VSC-converter, the plant comprises an arrangement adapted to control the turning on of the second power semiconductor device when a voltage is applied to the converter and by that the voltage increase on the direct voltage side. It will by this be possible to manage without any switching-in-resistance mentioned above, and the voltage increase may nevertheless be kept within acceptable limits by controlling the turning on, i.e. the control angle of the power semiconductor device, preferably a thyristor.

According to another preferred embodiment of the invention the controllable second power semiconductor device is adapted to be in the conducting state at normal operation of the plant. This means that this power semiconductor device at normal operation of the plant will in principle function as a free-wheeling diode, but when desired it may be controlled into the blocking state, i.e. so that it does not conduct in the forward biased direction for avoiding the disadvantages of a rectifying diode in such fault states.

According to another preferred embodiment of the invention the plant comprises an arrangement adapted to control the first and second power semiconductor devices through a light conductor in common by coded orders. A degree of complicity of the control electronic of the plant being essentially unchanged will by this be obtained in spite of the fact that in such a plant the second power semiconductor device is controllable contrary to the case of such plants already known.

According to a preferred embodiment of the invention the controllable second power semiconductor device is a thyristor, in which this may be only controllable and not of turn-off type, or a GTO of turn-off type. The second power semiconductor device could also be constituted by an IGBT.

The first power semiconductor device is preferably an IGBT.

Further advantages as well as advantageous features of the invention will appear from the following description and the other dependent claims.

BRIEF DESCRIPTION OF THE DRAWINGS

With reference to the appended drawings, below follows a specific description of a preferred embodiment of the invention cited as an example.

In the drawings.

DETAILED DESCRIPTION OF A PREFERRED EMBODIMENT OF THE INVENTION

Figure 3:
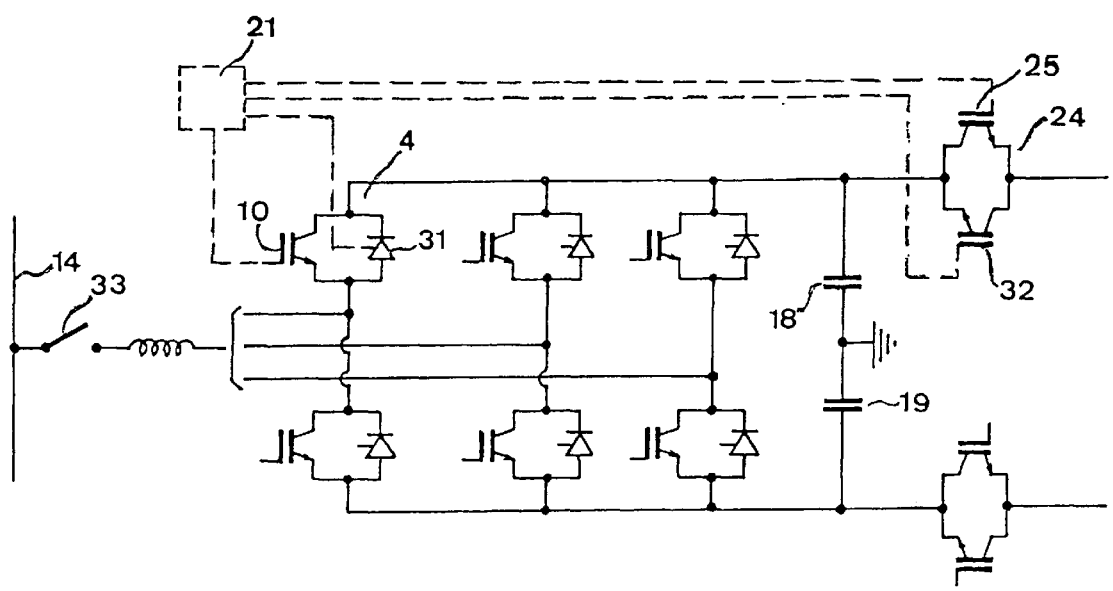
FIG. 3 is a view corresponding to these views of a plant according to a preferred embodiment of the invention.

The general structure of the preferred embodiment of the invention shown in FIG. 3 appears from the description above of the plants already known, and parts thereof that may be found in the plant according to the preferred embodiment of the invention and have the same function as in the plants already known are in FIG. 3 provided with the same reference numerals and will not be further described here.

The plant according to the invention has two considerable differences with respect to the plants already known, in which the first is constituted by the fact that the second power semiconductor devices, which in the plants already known have been formed by rectifying diodes, are here replaced by a controllable power semiconductor device 31, which in the present case is a thyristor. The thyristor 31 is connected in anti-parallel with the power semiconductor device 10 of turn-off type of the valve, which preferably is an IGBT (Insulated Gate Bipolar Transistor). The first power semiconductor device 10 of turn-off type and the controllable second power semiconductor device 31 is preferably controlled by one and the same control arrangement 21, and this can take place through a light conductor in common between the control arrangement on ground level and the valve on high potential level, although in the figure for the sake of clearness two different dashed lines are drawn to the gate of the respective power semiconductor device. All power semiconductor devices of the different valves are of course controlled through the control arrangement 21 in a corresponding way only illustrated for the valve 4 for the sake of simplicity. Furthermore, the symbol for each power semiconductor device in the valves is to be interpreted as a summarising symbol for a possibly high number of such power semiconductor devices connected in series.

The thyristors 31 will at normal operation of the converter be turned on, i.e. in the conducting state, so that they function as a rectifying diode, i.e. enable a flow of a current therethrough when they are forward biased, but they are blocking when they are reversed biased. However, would a ground fault occur on the direct voltage network the control arrangement 21 controls the thyristors to be turned off at zero point passage, so that the current is eliminated after a maximum of one period. This means that the heat dissipation in the thyristor 31 can be kept down on an acceptably low level and damage on the equipment may be avoided without the need of over dimensioning any components. Thus, the first power semiconductor device has to be designed for reverse biased blocking voltage, which has not been necessary in devices already known having free-wheeling diodes as second power semiconductor devices.

When the converter has to be brought under voltage after an interruption of operation by closing the breaker 21 for connecting the alternating voltage network 14 the voltage increase taking place through charging the direct voltage capacitors 18, 19 through the thyristors 31 may be controlled to take place in a well controlled way by the fact that the control arrangement 21 is adapted to regulate the control angle of the thyristors 31. Thus, no particular arrangements of switching-in-resistances or the like are needed. Furthermore, the possibility to control the voltage increase by regulating the control angle also enables voltage testing of direct voltage switch gears and lines by a voltage increase controlled by manpower (Open Line Test).

Figure 1:
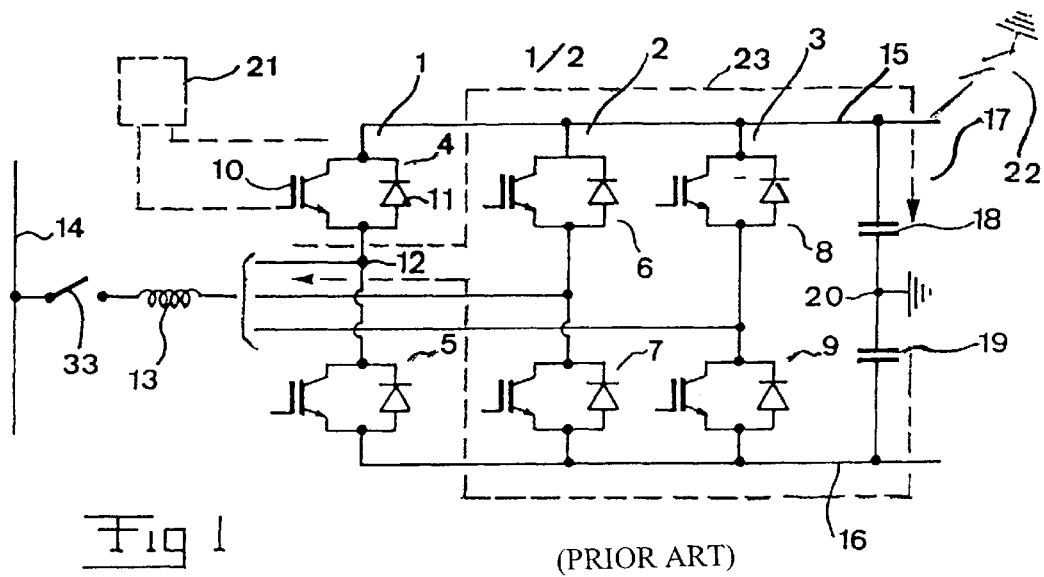
FIGS. 1 and 2 are simplified circuit diagrams illustrating plants for transmitting electric power according to the prior art.
Figure 2:
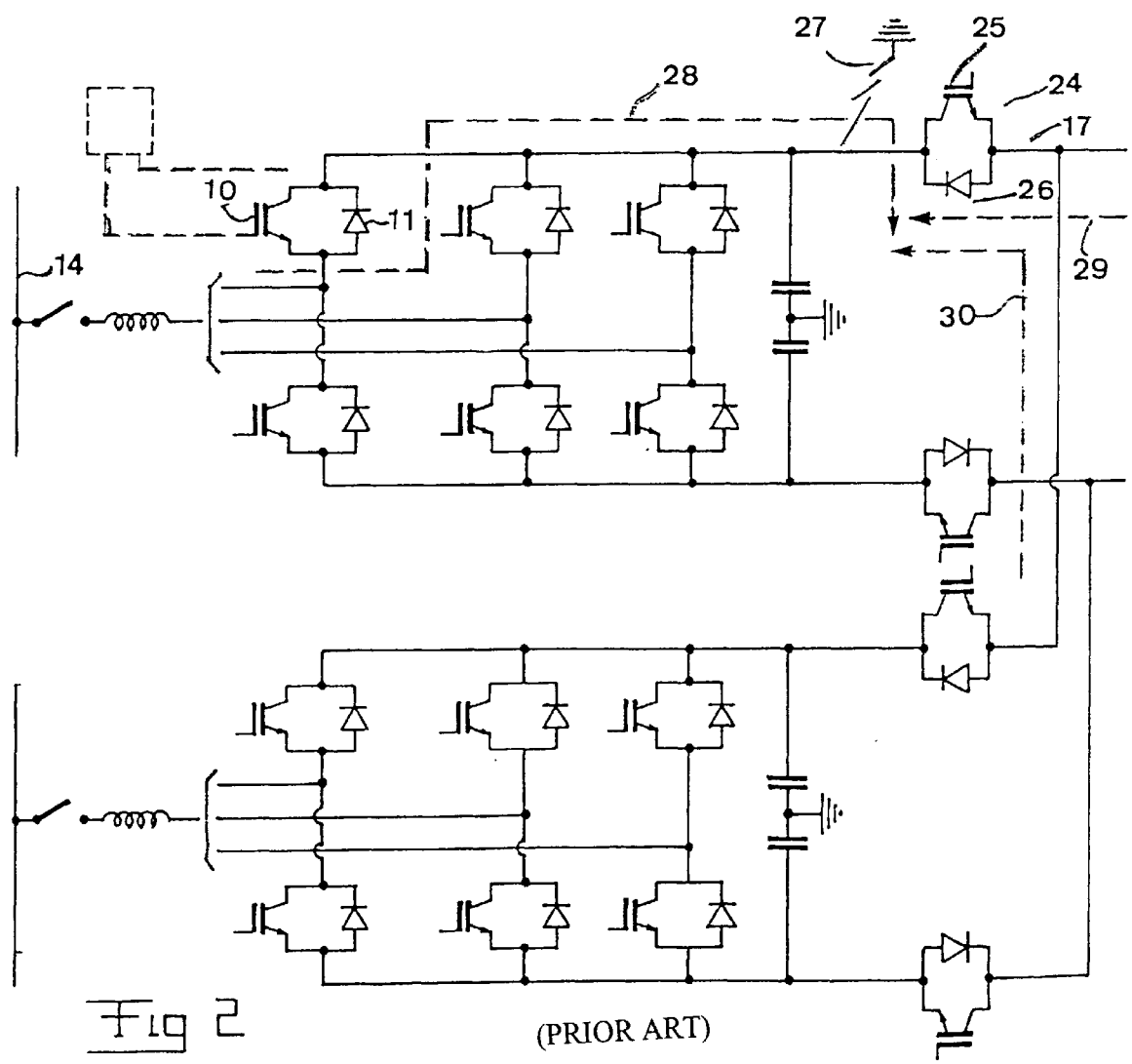

Another difference between the plant according to FIG. 3 and the plants of this type already known consists in the fact that in the switch 24 to be acting as a disconnector the rectifying diode has been replaced by a second power semiconductor device 32 of turn-off type, which advantageously is an IGBT, but it may also be a GTO. The power semiconductor devices 25 and 32 are controlled by the control arrangement 21, and they are preferably controlled simultaneously through the same order through one and the same line, even if two dashed lines are drawn from the control arrangement 21 thereto in the figure for illustrating the function. During normal operation of the plant the switch or the disconnector 25 is closed, i.e. the two power semiconductor devices of turn-off type are turned on, so that current may freely flow therethrough from the direct voltage network to the alternating voltage network and conversely. However, would a fault occur, for example a ground fault on the direct voltage network, the quick disconnector is then controlled to open by sending a turn-off order to the two power semiconductor devices 25 and 32. In the case that the fault is within the converter it may in this way through turning the power semiconductor device 32 off be ensured that no fault current is fed in from the direct voltage network to the fault, so that components of the converter are protected, but it is also obtained that no overcurrents arise as a consequence of the fault in other converters of other stations connected to the same direct voltage network in the case of a multiple station system having a direct voltage network of a so called meshed fashion illustrated in FIG. 2. Such overcurrents would namely mean that the quick disconnectors connected to these stations would also disconnect them, so that all transmission on the direct voltage network would be interrupted. However, this is avoided by turning the second power semiconductor device 32 of exactly the converter subjected to a fault off.

The invention is of course not in any way restricted to the disclosure above, but many possibilities to modifications thereof would be apparent to a man with skill in the art, without departing from the basic idea of the invention, such as defined in the appended claims.

It is of course completely within the scope of the invention to maintain the diodes in the valves in a plant of the type shown in FIG. 3 but arrange a controllable power semiconductor device in the disconnectors or conversely if desired, although it would in most cases be advantageous to arrange controllable power semiconductor devices in both places. A switch of the type defined above could be arranged at any location of a line intended for transmitting electric power, and with respect to the converter case the converter could have another structure, for example be of NPC-type (Neutral Point Clamped).

What is claimed is:

1. A plant for transmitting electric power comprising a first power semiconductor device having conducting and non-conducting states and being connected in series with a conductor and a second power semiconductor device having conducting and non-conducting states, connected in anti-parallel therewith and being able to assume the non-conducting state in which it blocks conduction of current therethrough when voltage is applied to the first power semiconductor device in a conducting direction thereof and being able to assume the conducting state in which it conducts current therethrough when voltage is applied over the first power semiconductor device in a direction opposite to the conducting direction, said first semiconducting device comprising a turn-off type power source and the second semiconducting device comprising a controllable device having a conducting direction opposite to that of said first power semiconductor device; a switch wherein the first power semiconductor device is operable to conduct current during normal function of the plant and operable to be turned off for fulfilling a dis-connector function when desired, said switch is arranged in a network for transmitting high voltage direct current (HVDC) for safety disconnection upon occurrence of a fault, the switch being arranged proximate to a converter associated with a first station for converting direct voltage into alternating voltage conversely comprising an arrangement adapted to control a change of state of the second power semiconductor device to the blocking state for preventing feeding of current towards the converter when desired, and at least one converter of a second state being connected in parallel with said proximate converter, said converters belonging to different stations of a multiple station system having direct voltage networks connected in a meshed fashion.

2. The plant according to claim 1, when said arrangement is adapted to cause said change of state in response to occurrence of a fault.

3. The plant according to claim 1 comprising a VSC-converter for converting direct voltage into alternating voltage or direct voltage and conversely and which has at least one phase leg with two current valves, each having an end and being connected in series, and in which a point of the phase leg between said connected valves is intended to be connectable to a phase of a direct voltage or alternating voltage network and the ends of the phase leg are connectable to a pole conductor each of a direct voltage network wherein the valves comprise at least one additional semiconductor device and at least one additional second power semiconductor device connected in anti-parallel therewith.

4. The plant according to claim 3, wherein the converter comprises a two level converter.

5. The plant according to claim 3, wherein the converter comprises an NPC-converter.

6. The plant according to claim 3, further comprising an arrangement adapted to control the turning on of the additional second power semiconductor device when a voltage is applied to the converter and by an increase in the voltage applied on the direct voltage side.

7. The plant according to claim 3, wherein the second power semiconductor device is adapted to be in the conducting state during normal operation of the plant.

8. The plant according to claim 3, further comprising an arrangement adapted to control the first and the second power semiconductor device through a light conductor in common through coded orders.

9. The plant according to claim 1, further comprising an arrangement adapted to control first power semiconductor device and the second power semiconductor device simultaneously through one and the same order.

10. The plant according to claim 1, further comprising a plurality of first power semiconductor devices connected in series and a plurality of second power semiconductor devices connected in series connected in anti-parallel therewith.

11. The plant according to claim 1, wherein the controllable second power semiconductor device comprises a thyristor.

12. The plant according to claim 1, wherein the second power semiconductor device comprises an IGBT.

13. The plant according to claim 1, wherein the controllable second power semiconductor device comprises a gate turn off.

14. The plant according to claim 1, wherein the first power semiconductor device comprises an IGBT.

15. The plant according to claim 1, wherein the first power semiconductor device comprises a gate turn off thyristor.

* * * * *